(12) United States Patent
Tommei et al.

(10) Patent No.: US 9,766,439 B2
(45) Date of Patent: Sep. 19, 2017

(54) DOMESTIC HELIOSTAT AND METHODS OF MAKING SAME

(71) Applicant: Solenica, San Diego, CA (US)

(72) Inventors: Diva Tommei, Rome (IT); Daniele Tommei, Rome (IT)

(73) Assignee: Solenica, Inc., San Diego, CA (US)

( * ) Notice: Subject to any disclaimer, the term of this patent is extended or adjusted under 35 U.S.C. 154(b) by 0 days.

(21) Appl. No.: 14/874,374

(22) Filed: Oct. 2, 2015

(65) Prior Publication Data

US 2017/0097501 A1    Apr. 6, 2017

(51) Int. Cl.
| | |
|---|---|
| *G02B 19/00* | (2006.01) |
| *F21S 11/00* | (2006.01) |
| *G02B 26/08* | (2006.01) |
| *F24J 2/38* | (2014.01) |
| *G01S 3/786* | (2006.01) |
| *G02B 7/182* | (2006.01) |

(52) U.S. Cl.
CPC ........ *G02B 19/0042* (2013.01); *F21S 11/005* (2013.01); *F24J 2/38* (2013.01); *G01S 3/7861* (2013.01); *G02B 7/1827* (2013.01); *G02B 19/0019* (2013.01)

(58) Field of Classification Search
CPC ............ G02B 19/0042; G02B 19/0019; G02B 26/0816; F21S 11/005; F24J 2/38; F24J 2/506; F24J 2/52; F24J 2/54; H01L 31/0547; G01J 1/20; G03B 21/00

USPC ....... 359/225.1; 353/8; 250/203.4, 203, 201, 250/202, 216, 234, 235, 236; 126/576, 126/689, 270, 271
See application file for complete search history.

(56) References Cited

U.S. PATENT DOCUMENTS

| | | | | |
|---|---|---|---|---|
| 4,283,887 A | * | 8/1981 | Horton | E04H 15/22 126/570 |
| 4,691,075 A | * | 9/1987 | Murphy | F24J 2/50 136/246 |
| 2009/0183730 A1 | * | 7/2009 | Knight | F24J 2/38 126/578 |
| 2010/0229850 A1 | * | 9/2010 | Sankrithi | F24J 2/1052 126/601 |
| 2014/0293466 A1 | * | 10/2014 | Von Kries | F24J 2/02 359/870 |
| 2015/0323772 A1 | * | 11/2015 | Serrano Gallar | F24J 2/1047 359/853 |

FOREIGN PATENT DOCUMENTS

WO    2011135524    11/2011

* cited by examiner

*Primary Examiner* — Frank Font
(74) *Attorney, Agent, or Firm* — Lewis Kohn & Walker LLP; David M. Kohn; Kari Moyer-Henry (57) ABSTRACT

A heliostat contained within a mechanical enclosure is described that optimizes the heliostat for domestic applications by emphasizing features of durability, protection from outside weather, low cost of manufacture, self-powering, light-weight, and aesthetics.

16 Claims, 4 Drawing Sheets

DOMESTIC HELIOSTAT AND METHODS OF MAKING SAME

FIELD OF THE INVENTION

The present invention relates generally to the field of heliostats and solar arrays. More specifically, the present invention pertains to a heliostat protected by a mechanical enclosure that renders it optimized for domestic lighting use.

BACKGROUND OF THE INVENTION

As is known, a heliostat is a device used to follow the Sun's route during the span of the day, usually to orient the light thereof towards a precise target thanks to the help of one or more mirrors.

Today heliostats are mostly used in industrial thermodynamic processes to increase the temperature of thermal devices on towers, by the simultaneous use of several heliostats pointing at the same target, which are indispensable to obtain the necessary temperatures for devices that convert heat into electricity.

However, other applications for heliostats may include light-redirection for domestic and city uses, in which the heliostat redirects sunlight towards an object, room, street, monument or piazza to illuminate, brighten and/or warm.

Most sunlight redirection systems in use today are expensive and require intensive and invasive installation procedures that could be obviated by the subtle use of heliostats.

However, if one wanted to use a heliostat as a domestic device to place indoors (on a window sill, kitchen-island, desk, nightstand, wall or ceiling to name a few options) or outdoors (balcony railing or garden for example) in order for such domestic device to be in direct contact with the sun that it then is able to redirect where sunlight is most needed, which could be indoors (on the ceiling to obtain a diffuse lighting effect thanks to the scattering provided by the ceiling material or in specific parts of the building to obtain a task-based lighting effect such as to illuminate a specific area of the building like a desk or a plant) or outdoors (on patios or backyards that are in the shade and require sunlight), the heliostat systems in use today would prove to be rather inadequate. Most heliostats, in fact, focus on emphasizing and optimizing the features that are fundamental in industrial applications, such as pointing accuracy, planarity of the mirror, stability and robustness of the mechanics. But other features become important when developing a heliostat for domestic applications, such as but not limited to compactness, portability, self-powered autonomy, lightness, low maintenance times, low-cost of the entire system and protection from outside weather.

In order to create a heliostat that is optimized for domestic use one needs to revisit the key components that make a heliostat and re-arrange them so that optimization of the domestic features are emphasized.

U.S. Pat. No. 4,192,583 to Horton defines a heliostat assembled within a protective enclosure supported by a foundation mounted in the ground. While this is a means of protection from weather elements, such an enclosure does not allow for the portability required of a heliostat for residential indoor as well as outdoor use.

U.S. Pat. No. 4,283,887 to Horton et al. defines a bubble-like enclosure for a heliostat that is inflated by filling it with pressurized air. Whilst this patent clearly defines a means of protection of the heliostat contained within such an enclosure, it is in no way addressing any of the other features of compactness, portability, self-powered autonomy, low-maintenance time or low-cost. In fact, such a protective structure is intended for larger heliostats that need to be installed on the ground and are supported by a foundation in the form of a soil filled, plastic ring-bag mounted in the ground at the heliostat site.

U.S. Pat. No. 4,620,382 to Sallis teaches an apparatus for pneumatically or hydraulically tensioning a membrane, which stretched membrane can support a reflective surface for use as a heliostat in a solar energy collection system. A disadvantage to this type of heliostat device is the absence of an enclosure to protect the heliostat device from outside elements.

U.S. Pat. No. 4,870,949 to Butler teaches a wind resistant, two axis tracker that is used to direct a solar reflector, heliostat, or dish antenna. An elevation drive ring is supported in a vertical orientation by dolly wheels rotatably attached to a base. The reflector is attached at two points along the circumference of the elevation drive ring. In the preferred embodiment, a reflector having a diameter slightly less than the inside diameter of the elevation drive ring is mounted to the elevation drive ring. A number of support members, such as cables, extend from the elevation drive ring to the periphery of the reflector. Azimuth adjustment is either provided by incorporating a horizontal turntable or drive ring as part of the base, or by pivoting the reflector within the elevation drive ring by adjusting the respective lengths of the support cables extending laterally from the elevation drive ring to the periphery of the reflector. Drawbacks with this type of heliostat device is that it does not include an enclosure to protect the heliostat device and is primarily concerned with using a centerless elevation drive combined with a turntable azimuth drive for reflectors in order to reduce the structure/weight of materials for wind resistance. This may be suitable under extreme conditions, such a design would be impractical and ineffective for the domestic use of a scaled down heliostat device.

U.S. Pat. No. 7,887,188 to Knight, while disclosing a heliostat comprised of a mirror that is placed in two hemispheres that are joined together, wherein the mirror contains a plurality of wheels that run on the inner surface of the sphere so as to move it and orient it towards the target, it manages to maximize the mirror size that can be fit inside the sphere but completely fails at providing an optically smooth surface for the inbound and outbound sunlight, where by inbound one means the sunlight from the sun to the mirror and by outbound the sunlight reflected from the mirror to the target. Such a hemisphere joint does not allow both inbound and outbound sunlight to enter or exit unhindered from the disclosed enclosure. This would confuse any optical sensor that based its accuracy on the angle created by the incoming and outgoing rays if those rays are deviated in their path by a significant refractivity effect. More importantly, in operation the frictional contact between the wheels and the sphere's inner surface would inevitably start to leave marks on the inner surface and over time these would not only become unsightly, but would also negatively affect the optical performance of the heliostat.

U.S. Pat. No. 8,132,928 to Bronstein et al. describes an improved solar reflector utilizing a tensioned reflective membrane, further including a membrane attached to the outer surface of a metal strap that is positioned on an end form by means of a curved-face tensioning block. While linear tensioned membrane reflectors have some advantages over more rigid structures, such membranes present a variety of problems compared to those reflector technologies using more rigid frames. For example, most membranes utilize certain laminates, such as films, as a substrate for the membrane. Mylar (Biaxially-oriented polyethylene terephthalate boPET polyester film) is a dimensionally stable material that reacts in undesirable ways when the film is placed under compression. A typical means of mounting the membrane is to adhere it to the underside of a metal strap with a structural adhesive, such as epoxy. The strap is then wrapped around the end form and clamped in place. However, as the strap is bent around the end form the strap's inward facing surface and the membranes are placed in compression, wrinkles are produced. Such defects are then crushed and locked in place as the strap is tightened on the end form. These distortions in the film are magnified by the film and transmitted into the membrane as large longitudinal wrinkles and ripples that span across the entire membrane's surface, distorting its shape and resulting in a diminished performance for its intend purpose.

There is a need in the art to provide a solution to the large scale heliostats that are incapable, unsuitable and impractical for domestic use while simultaneously providing for enhanced benefits when compared to the state of the art in heliostats.

SUMMARY OF THE INVENTION

The present invention provides a mechanical enclosure for a heliostat that renders it optimized for domestic lighting use in accordance with the claims of the present invention.

In one embodiment, the present invention provides for a domestic heliostat that encompasses all the characteristics of a domestic object in one compact device, those characteristics being portability, light-weight, self-powering, wireless, sleek design, low maintenance, and resistance to outdoor weather. It is also designed to have a low cost of manufacture. In one aspect, the deleterious effects of weather on the functional components of the heliostat are minimized. In yet another aspect, the design of the present invention greatly reduces the effects of wind-loading on the mirror. These aspects are achieved by enclosing the steerable mirror and its electromechanical control systems inside a transparent enclosure. In a preferred embodiment, the mirror and control system are completely sealed from the outside.

In yet another embodiment, the present invention provides for a domestic heliostat including: a steerable mirror, a mechanical mirror-steering mechanism, a steering control-system, a steering-control sensor, all contained within a mechanical enclosure wherein the mechanical enclosure has a break-line or joint about which the enclosure may be separated into two or more parts. In one aspect, this embodiment is further characterized in that: at least one portion of the mechanical enclosure is in the shape of a portion of a spherical-shell and such portion is made of optically transparent material, further wherein the transparent spherical-shell shaped portion of the enclosure subtends a solid angle at center of the sphere of more than 2 pi steradians. In another aspect, the trajectory of the joint that divides the mechanical enclosure in two parts is optimized to allow the insertion of the largest possible mirror inside the mechanical enclosure so as to maximize the solar energy and illumination reflected on the target, with this optimization being saddle shaped or elliptical. In yet another aspect, the steerable mirror is preferably circular in order to maximize the reflective area that will fit inside the mechanical enclosure, which is preferably spherical in shape, and the steerable mirror has a radius that is smaller than the inner radius of the spherical portion of the mechanical enclosure. In yet another aspect, the steerable mirror is rotatably mounted about two axes that intersect at or near the geometric spherical center of the spherical portion of the mechanical enclosure. In a further aspect, the steerable mirror is mounted such that its reflective surface over a major portion of its steerable rotatable position range, faces the spherical portion of enclosure made of optically transparent material. In another aspect, the steering-control sensor is fixed to the inner surface of the mechanical enclosure. In yet another aspect, the heliostat is electrically self-powered.

Another embodiment of the present invention describes a mechanical enclosure for a heliostat characterized in that the spherical portion of the mechanical enclosure of the heliostat is greater in solid angular extent than a hemisphere and preferably greater in solid angular extent than five-fourths of a hemisphere and, preferably, in at least one dimension that subtends an angle of as much as 270 degrees at the center of the sphere. In one aspect, the joint trajectory that divides the mechanical enclosure in two parts additionally allows for the insertion of a mechanical mirror-steering mechanism and steering control-system into the enclosure whereas the joint trajectory is elliptical, or is saddle shaped and it does not intersect the portion of the mechanical enclosure which is substantially spherical in shape and is made of optically transparent material. In another aspects, the joint trajectory is chosen such as to leave as great an area as possible, and possibly all, of the substantially spherical portion of transparent enclosure unbroken.

In another embodiment, the electrical self-power that powers the mirror steering mechanism and control system of the heliostat is provided by one or more first photovoltaic cells, wherein the first photovoltaic cell(s) are located within the mechanical enclosure, which is provided with a transparent window wherein the first photovoltaic cell(s) are positioned so as to be visible to the outside through the transparent window. In one aspect, this window may be partly or wholly provided by the spherical portion of the mechanical enclosure that is made of optically transparent material. In another aspect, these first photovoltaic cell(s) are mounted co-moving with the steerable mirror such that their optically sensitive surface(s) face substantially in the same direction as the reflective surface of the steerable mirror.

In yet another embodiment of the present invention, the steering-control sensor is fixed to the inner surface of the mechanical enclosure and is positioned such as to minimize its obstruction to the passage of light from the sun to the heliostat's target, and preferably below the horizontal midline plane of the mechanical enclosure. In one aspect, the steering-control sensor may be powered by the first photovoltaic cells, but is preferably self-powered independently of the heliostat's electrical self-power, and is preferably self-powered by one or more second photovoltaic cells co-mounted with the steering-control sensor. In another aspect, these second photovoltaic cell(s) are mounted such that their optically sensitive surfaces face towards the center of the steerable mirror or towards the zenith. The steering-control sensor preferably communicates with the steering control-system wirelessly via an infra-red (IR) link or a radio link. Optionally, the steering control sensor communicates with the control system via a wired connection.

In another embodiment, the mechanical mirror-steering mechanism and the steering control-system are both mechanically mounted on the rear (non-reflective side) of the steerable mirror and are substantially hidden from sight of external viewers by the non-transparent sections of the heliostat's mechanical enclosure and/or by the steerable mirror. Alternatively, the mechanical mirror-steering mechanism is preferably attached to the mechanical enclosure at substantially one position only on a non-transparent portion of the mechanical enclosure.

In yet another embodiment, the steering control mechanism is remotely controllable from outside of the mechanical enclosure preferably without a wired link, via a radio link, an infra-red (IR) link, a wireless link (ie. WiFi) or an acoustic link that is preferably ultrasonic.

In an alternative embodiment, the mechanical enclosure is substantially rigid, is substantially sealed from the external environment and is preferably hermetically sealed, is preferably provided with a desiccator element, such as silica gel, and is made of material(s) that is substantially shatter-proof and preferably a category of plastics materials, e.g. methacrylate polymers or polycarbonate. The overall size of the mechanical enclosure is optimized for domestic lighting use; the largest dimension of the mechanical enclosure is preferably not less than 20 cm and preferably not more than 100 cm, and more preferably not more than 60 cm.

In yet another embodiment, all of the internal components to the mechanical enclosure are preferably chosen to be of lighter construction than would be required to withstand normal outdoor wind loading in the absence of the enclosure, and the thickness of the steerable mirror is preferably chosen to be substantially less than the minimum thickness of the mirror that would be required to avoid substantial bending were the mirror to be exposed directly to normal outdoor wind loading. Similarly, the mechanical mirror-steering-mechanism is chosen to have substantially smaller holding torque than would otherwise be required were the steerable mirror to be exposed directly to normal outdoor wind loading. In this way, much lighter and cheaper components may be used to build a well-functioning heliostat by minimizing their strength or torque specifications through shielding of the components from wind loading by the mechanical enclosure.

In another embodiment, the external shape of the mechanical enclosure is such as to provide low wind-loading torque on the mechanical enclosure when exposed to winds coming from any horizontal direction. In one aspect, the external shape of the mechanical enclosure is preferably an ellipsoid with one axis in the vertical direction or more preferably is a spheroid or sphere. In another aspect, the material of the transparent portion of the mechanical enclosure is thin enough to prevent significant refraction errors of pointing and is not more than 10 mm thick, and preferably not more than 5 mm thick, and most preferably not more than 2 mm thick. In another aspect, the material of the transparent section of the mechanical enclosure is sufficiently optically smooth to prevent optical aberrations from significantly degrading the heliostat pointing precision and is preferably optically smooth to at least 10 micro.meter, and more preferably to 5 micro.meter, and even more preferably equal to or better than 1 micro.meter.

In another embodiment, the steerable mirror is selected from the group consisting of a plane mirror, a concave mirror and a convex mirror.

DETAILED DESCRIPTION OF THE INVENTION

The present invention provides for a domestic heliostat providing for all the benefits of a full scale version without the ensuing disadvantages of same.

To minimize the deleterious effects of weather, for example, on the functional components of a heliostat, and also to greatly reduce the effects of wind-loading on the mirror, the present invention provides for the steerable mirror and its electromechanical control systems being inside a transparent enclosure, preferably completely sealed from the outside.

To allow the heliostat of the present invention to track the sun across the greatest possible angle (e.g. from sunrise to sunset) it is important to maintain a clear, unobstructed and continuous optical path through the enclosure both for the sun's rays to enter, be reflected off the mirror, and exit to the target of the heliostat. It is also important that the optical sun-sensor component that allows automatic steering of the heliostat as the sun moves has a continuous and unobstructed view of the sun through the enclosure over its fill steering angle.

These requirements suggest a spherical-shell transparent enclosure as providing for the optimal design. Since the steering angle can be as much as 90 degrees, and since the mirror itself subtends nearly 180 degrees of such a spherical housing, it is preferred that a nearly 270 degree, unobstructed section of spherical-shell housing is desirable.

To maximize the reflective capability of the mirror within the heliostat of the present invention, it is desirable to make the size of the mirror as large as possible, and for a spherical housing, such a maximum mirror size corresponds to a circular mirror of diameter just less than the inner-diameter of the spherical-shell (to allow clearance when the mirror moves within the shell). In order to fit such an optimally sized mirror inside the spherical housing, one proposed solution provides for a division of the spherical shell into two hemispheres, which allows the mirror to then be assembled to its mountings within the shell, after which the two halves of the shell can be closed.

However, if the spherical housing is split into two hemispheres, there will always be some portion of the path of the sun's rays throughout the day, through the housing onto the mirror and off the mirror and out of the housing to the target, that goes through the hemispherical joint, and this will both scatter the incoming and/or outgoing light, and also seriously affect the correct operation of the optical sun-sensor. It is one of the intentions of the present invention to eliminate this problem of the optical path of the enclosed heliostat being corrupted by joint lines in the housing, by a preferred embodiment of spherical-shell housing geometry.

In practice the trajectory of the joint that divides the mechanical enclosure in two parts (and which effectively defines the shape of the aperture through the spherical shell) is optimized to allow the insertion of the largest possible mirror inside the mechanical enclosure so as to maximize the solar energy and illumination reflected on the target, to allow clearance of any components (e.g. for sensing and/or steering fixed to the front or rear of the mirror while inserting the mirror), and to allow adequate access for assembly of the internal components of the heliostat. This optimized shape essentially forms a slot in the spherical-shell housing and two preferred embodiments of the near-optimized shape for the aperture are saddle shaped or elliptical shaped.

Figure 1:
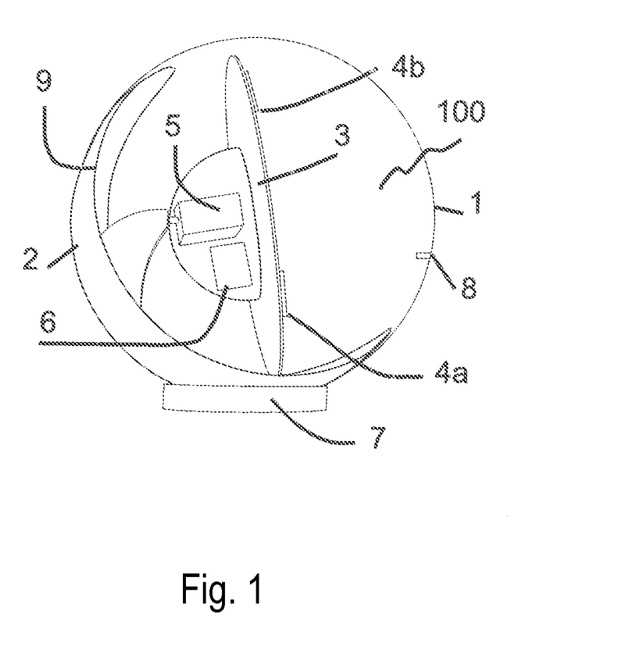
FIG. 1 depicts a side view of the mechanical enclosure containing the heliostat of the present invention.

With reference to FIG. 1, the present invention provides for a domestic heliostat in a mechanical enclosure 100, a substantially spherical and transparent front hard shell 1, and a not necessarily spherical and preferably not transparent rear shell 2, joined together by a joint or break-line 9 in the shape of a saddle in this particular embodiment.

FIG. 1 further indicates a steering control sensor 8 sited on the inside of the front hard shell 1, and that the rear shell 2 rests on a stand 7 and supports internally a rigid circular steering mirror 3 with two attached photovoltaic cells 4a and 4b. A mechanical mirror-steering mechanism 5 and a steering control system 6 can also be preferably mounted to the rear of the mirror.

Figure 2A:
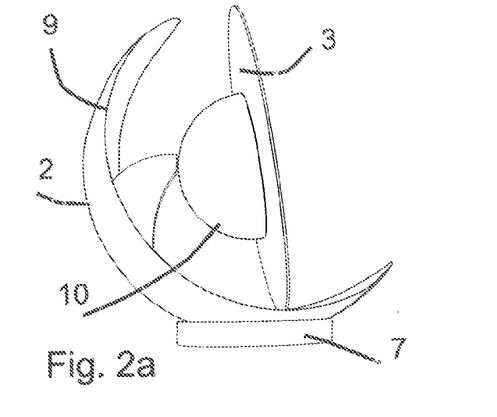
FIG. 2(a)-(c) depict a variety of lateral views of the inside of the rear shell and steering mirror, (a) an internal side view of the rear shell with steering mirror; (b) a rear perspective view of the rear shell of the mechanical enclosure with steering mirror; (c) a top perspective view of the rear shell with steering mirror.
Figure 2B:
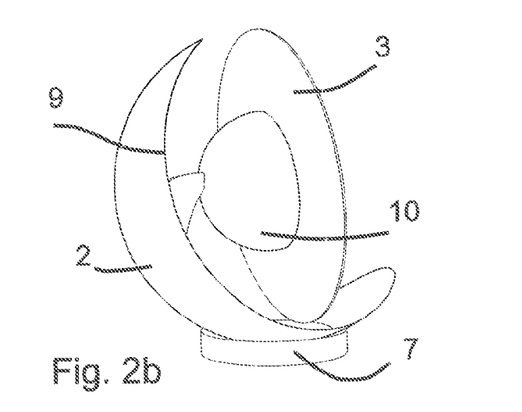
Figure 2C:
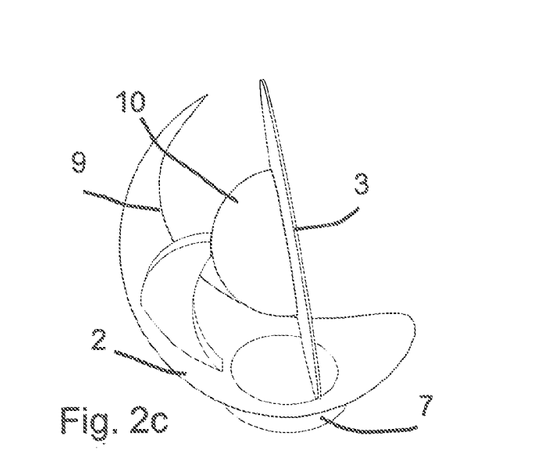

As observed in FIG. 2(a)-(c), the present invention provides for a rear shell 2 of mechanical enclosure 100 comprised of a steering mirror 3, a housing 10 where mechanical mirror-steering mechanism 5 (not shown) and steering control system 6 (not shown) are housed, and stand 7. FIG. 2(b) shows a rear view of the rear shell 2 of mechanical enclosure 100 comprised of the steering mirror 3, the housing 10 and the stand FIG. 2(c) shows a top perspective view of the rear shell 2 comprised of the steering mirror 3, the housing 10 and the stand 7. In each of the above described figures, the saddle shaped break-line 9 defines the perimeter of rear shell 2.

Joint or break-line 9 allows this particular embodiment to maximize the optically smooth area of front transparent hard shell 1 available in front of the steering mirror 3 by retaining a saddle shape that at the same time is able to maximize the size of the steering mirror 3 that may be fitted within it. With the trajectory of the break-line 9, the front transparent hard shell 1 of mechanical enclosure 100 is extended enough so as to allow the unobstructed entrance of sunlight through the front transparent hard shell 1 towards the steering mirror 3 and its ensuing exit via reflection of sunlight from the steering mirror 3 through the front hard shell 1 towards the target (not shown), over a very wide range of mirror steered positions. In situations in which the steering mirror is laterally rotated to its maximum—such as sunrise and sunset in the most densely occupied regions of the northern hemisphere—the steering mirror 3 will have a clear view of the sky through the transparent front hard shell 1, unhindered by the joint or break-line 9 that must necessarily be present in order for the steering mirror 3 to be fitted inside the mechanical enclosure 100 during manufacture and for maintenance.

The steering control sensor 8 is situated on the front transparent hard shell 1 in front of steering mirror 3 so as to receive the reflected sunlight from the steering mirror 3 (outbound light) and hide as little as possible of the steering mirror 3 reflective surface from the target. Steering control sensor 8 is, in this particular embodiment, wirelessly connected to steering control system 6 through a pulsed-IR system (not shown) and powered by separate co-located photovoltaic cell(s) (not shown). In an alternative embodiment, steering control sensor 8 is wirelessly connected to steering control system 6 by means of a radio transmitter at the sensor and a radio receiver at the mirror steering motor controller. This radio system could be a WiFi- or Bluetooth-enabled module, or something much simpler and cheaper, as the data rate required is very low. The radio transmitter and receiver are each powered by separate co-located photovoltaic cells. Where WiFi or Bluetooth modules are fitted within the heliostat of the present invention, whether or not they are used for communication internally within the heliostat, they can be used to transmit data generated by but not limited to the steering control sensor 8, steering control system 6 and mechanical mirror-steering mechanism 5, to an external server or smartphone. Similarly, the present invention provides for the reception by the heliostat of control instructions and data from an external device such as a smartphone.

In another alternative embodiment, steering control sensor 8 could be physically connected to steering control system 6 by means of a wired connection. While this direct wired approach is simple and potentially very low cost, there are mechanical problems to be overcome with relative movement between the two ends of the connecting cable, as well as aesthetic issues with the visible wires, which makes the wireless approach more preferred.

The mechanical mirror-steering mechanism 5 contains all the gears and motors (not shown) capable of directing and moving the steerable mirror 3. Similarly, the steering control-system 6 contains all the electronics that dictate the movement of the steerable mirror 3 through the mechanical mirror-steering mechanism 5. In a preferred embodiment, the steering control system 6 is wirelessly connected to the steering control sensor 8 so as to accurately guide the movement of the steering mirror 3. In another embodiment, the connection between steering control system 6 and steering control sensor 8 is made wirelessly by means of a radio transmitter and receiver, which may be, for example, a WiFi- or Bluetooth-enabled module or a very simple low-data-rate radio system, or physically by means of one or more wired connection(s). Such a WiFi or Bluetooth module allows data collected by but not limited to the steering control sensor 8, steering control system 6 and mechanical mirror-steering mechanism 5, to be transmitted to an external server or a smartphone, as well as to allow the reception by the heliostat of control instructions and data from an external device such as a smartphone.

As further described in FIGS. 1 and 2(a)-(c), the circular steerable mirror 3 is mounted on two axes around which it is rotatably mounted, that intersect at or near the geometric spherical center of the transparent front hard shell 1. This allows the steering mirror 3 to be able to rotate freely without impacting the transparent front hard shell 1, the rear shell 2, or the stand 7.

The shape of housing 10 is not limited to a hemisphere, as represented in the present embodiment, but could be any geometrical shape or combination of shapes, including but not limited to, two hemispheres. Housing 10, the mechanical mirror-steering mechanism 5 and the steering control system 6, are connected to the mechanical enclosure 100 through a single point of contact that lies on one of the two axes of rotation.

Two photovoltaic cells 4a and 4b that accumulate the power for the steering control system 6 to move the steerable mirror 3 through the mechanical mirror-steering mechanism 5, are fixed to the surface of the steerable mirror 3, or onto an outer frame around the mirror that extends beyond the perimeter of the mirror's reflective surface. This location allows the photovoltaic cells 4*a* and 4*b* to always move jointly with the steerable mirror 3, which avoids shadowing of the steerable mirror 3 by the photovoltaic cells 4*a* and 4*b* and, at the same time, enables the photovoltaic cells 4*a* and 4*b* to always be oriented towards the sun, because the steering mirror 3 is oriented towards the sun automatically by the steering control system 6.

The mechanical enclosure 100 includes a stand 7, which can have different shapes according to its installation including, but not limited to, a flat foot for desk mounting, or a railing clasp for mounting on a balcony.

Figure 3A:
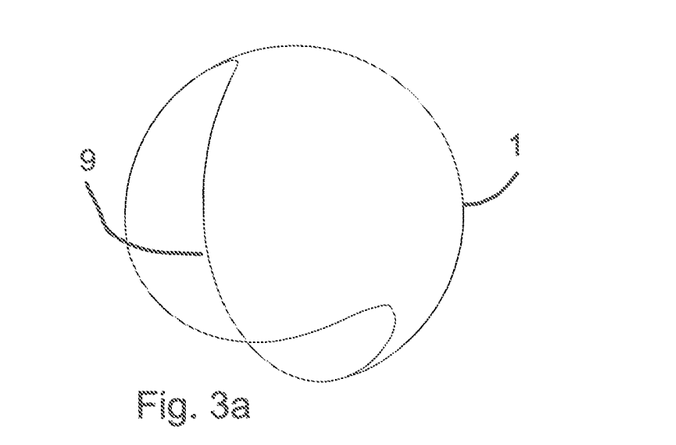
FIGS. 3(a) and 3(b) depicts a variety of view of the front transparent hard shell. (a) side view of the front transparent hard shell with break-line being centered in view; (b) an alternative perspective view of the front transparent hard shell.
Figure 3B:
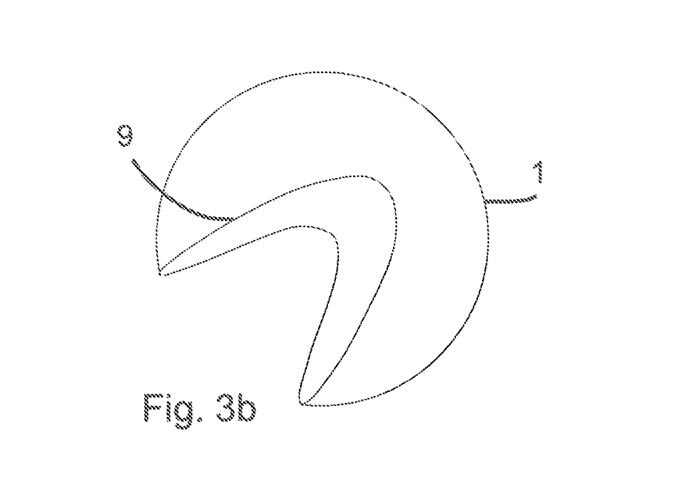

In accordance with FIGS. 3(*a*) and 3(*b*), the trajectory of joint or break-line 9 that divides in two the mechanical enclosure 100 is saddle shaped so as to minimize the optical aberrations experienced by the sunlight coming into and going out of after being reflected off of the steering mirror 3, the mechanical enclosure 100, while maximizing the size of the steerable mirror 3 and thus the solar energy and illumination delivered to the target.

FIG. 3(*a*) shows a side view of the transparent front hard shell 1 of the mechanical enclosure 100, whereby the joint or break-line 9 is central and part of the internal surface of the transparent front hard shell 1 can be seen as well. FIG. 3(*b*) shows a rotated side view of the transparent front hard shell 1 of the mechanical enclosure 100, whereby the joint or break-line 9 is clearly defined and again part of the internal surface of the transparent front hard shell 1 can be seen.

Figure 4A:
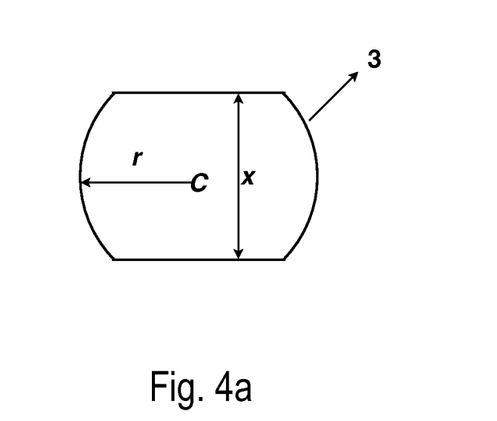
FIGS. 4(a) and 4(b) shows the central mirror having chord defined segments. (a) mirror having chord defined segments removed from two edges where x<2r or x is smaller than the diameter of the circular mirror; (b) bottom view of transparent hard shell with break-line.
Figure 4B:
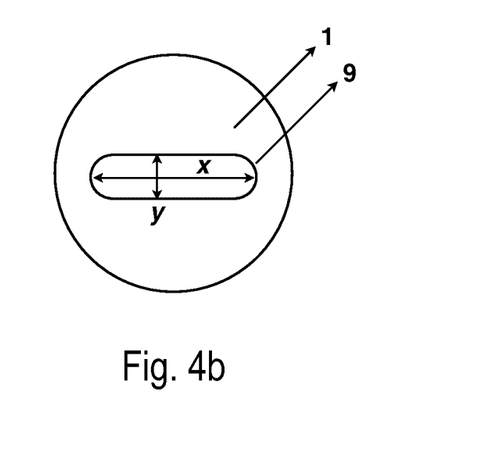

FIG. 4(*a*) shows mirror 3 as being circular with center C and radius r where the mirror 3 has chord-defined segments removed from two edges where the chords are parallel and distance X apart, where X<2r, or equivalently, X is smaller than the diameter of the circular mirror 3. FIG. 4(*b*) shows a bottom view of the substantially spherical and transparent front hard shell 1 with break-line 9 characterized by a width greater than chord separation X to allow passage through of the mirror with segments removed, and height y equal to the length necessary for the mechanism to fit through.

In another embodiment, the heliostat of the present invention is comprised of a steerable mirror, a mechanical mirror-steering mechanism, a steering control-system, a steering-control sensor, all contained within a mechanical enclosure wherein the mechanical enclosure has a break-line or joint about which the enclosure is separable into two or more parts, characterized in that at least one portion of the mechanical enclosure is in the shape of a portion of a spherical-shell, the spherical-shell shaped portion of enclosure is made of optically transparent material and the transparent spherical-shell shaped portion of enclosure subtends a solid angle at center of the sphere of more than 2 pi steradians. Additionally, the steerable mirror is either circular in shape or circular with one or more segments removed from the edge defined by chords, and where two such segments are removed with their respective chords being parallel, with an aperture in the spherical-shell formed by the break-line or joint having an extent in a first direction across the spherical-shell of greater than or equal to the diameter of the mirror where the mirror is circular and less than a mirror diameter where the mirror has one or more chord-segments removed from its edge, and in a second direction orthogonal to the first direction, the aperture so formed extends far enough to at least allow clearance for the thickness of the mirror. An additional aspect is the steerable mirror being circular with radius smaller than the inner radius of the spherical portion of enclosure with the steerable mirror being rotatably mounted about two axes, further wherein the two axes intersect at or near the geometric spherical center of the spherical portion of enclosure and the steerable mirror is mounted such that its reflective surface over a substantial portion of its steerable rotatable position range, faces the spherical portion of enclosure made of optically transparent material. Further, the steering-control sensor is fixed to the inner surface of the mechanical enclosure, wherein the heliostat is electrically self-powered and is able to transmit and receive wirelessly control-instructions and data to and from an external device such as a smartphone or external server.

Additionally, the spherical portion of the enclosure is greater in solid angular extent as viewed from the center of the sphere than a hemisphere. Optionally, the spherical portion of the enclosure is greater in solid angular extent as viewed from the center of the sphere than five fourths of a hemisphere.

As an optional aspect, the aperture in the spherical shell enclosure formed by the joint trajectory has dimensions greater than the outline dimensions of the mechanical mirror-steering mechanism and steering control. Preferably, the joint trajectory is elliptical or saddle shaped and does not intersect the one portion of the mechanical enclosure which is spherical in shape and which is made of optically transparent material. Additionally, the joint trajectory is chosen such as to leave as great an area as possible, and possibly all, of the spherical portion of the transparent enclosure unbroken.

In another embodiment, the heliostat of the present invention is self-powered, with such power provided by one or more first photovoltaic cells. Further, the first photovoltaic cell(s) are located within the mechanical enclosure, with the mechanical enclosure provided with a transparent window and the first photovoltaic cell(s) being positioned within the mechanical enclosure such as to be visible through the window from outside. Optionally, the transparent window is partly or wholly provided by the spherical portion of enclosure made of optically transparent material. Alternatively, the first photovoltaic cell(s) are mounted in a fashion that moves with the steerable mirror. Preferably, the first photovoltaic cell(s) are mounted such that their optically sensitive surface(s) face in the same direction as the reflective surface of the steerable mirror.

Optionally, the steering-control sensor fixed to the inner surface of the mechanical enclosure is positioned such as to minimize its obstruction to the passage of light from the sun to the heliostat's target, further wherein the steering-control sensor is positioned below the horizontal midline plane of the mechanical enclosure.

Alternatively, the steering-control sensor is self-powered independently of the heliostat electrical self-power and, more preferably, the steering-control sensor is self-powered by one or more second photovoltaic cells co-mounted with the steering-control sensor, with the second photovoltaic cell(s) being mounted such that their optically sensitive surface(s) face towards the center of the steerable mirror.

In an additional embodiment, the second photovoltaic cell(s) are mounted such that their optically sensitive surface(s) face towards the zenith.

In a further aspect, the steering-control sensor communicates wirelessly with the steering control-system. Optionally, the wireless communication is selected from the group consisting of infra-red (IR) link, radio link and WiFi link.

In an alternative embodiment, the mechanical mirror-steering mechanism and the steering control-system are both mechanically mounted on the rear (non-reflective side) of the steerable mirror. Optionally, the mechanical mirrorsteeling mechanism is attached to the mechanical enclosure at one position only. Alternatively, the one mechanical attachment position on the enclosure is situated on a non-transparent portion of the enclosure. In an additional embodiment, the mechanical mirror-steering mechanism and the steering control-system are hidden from sight of external viewers by the non-transparent sections of the enclosure and/or by the steerable mirror.

Optionally, the steering control mechanism is remotely controllable from outside the enclosure with a member selected from the group consisting of a wireless link, a radio link, an infra-red (IR) link and an acoustic link. Furthermore, the wireless link may be ultrasonic.

Preferably, the mechanical enclosure is sealed from the external environment, with such seal being optionally hermetic. Optionally, the mechanical enclosure further comprises a desiccator, wherein the desiccator is comprised of silica gel.

In yet another embodiment, the mechanical enclosure is made of material(s) that are shatter-proof and constructed of plastics materials. Preferably, the plastics materials may be selected from the group consisting of methacrylate polymers and polycarbonate.

Alternatively, the overall size of the mechanical enclosure is optimized for domestic lighting use, wherein the largest dimension of the mechanical enclosure is not less than 20 cm or not more than 100 cm, or not more than 60 cm. Optionally, the mechanical enclosure is rigid and the mechanical strengths of any or all of the components internal to the mechanical enclosure are chosen with no regard to direct wind loading.

In yet another embodiment, the thickness of the steerable mirror is chosen with regard to gravitational distortion due to its weight, but with no regard to wind loading. Optionally, the holding torque of the mechanical mirror-steering mechanism is chosen with regard to gravitational loading due to the weight of supported components but with no regard to wind-loading. Further, the external shape of the mechanical enclosure may be an ellipsoid, with one axis in the vertical direction. Optionally, the material of the transparent section of the mechanical enclosure is thin enough to prevent significant refraction errors of pointing.

In another embodiment, the thickness of material of the transparent section of the mechanical enclosure is not more than 10 mm, or not more than 5 mm, or not more than 2 mm. Preferably, the material of the transparent section of the mechanical enclosure is sufficiently optically smooth to prevent optical aberrations from significantly degrading the heliostat pointing precision. Most preferably, the material of the transparent portion of the mechanical enclosure is optically smooth to at least 10 um, or to 5 um, or to better than 1 um.

In a preferred embodiment, the steerable mirror is selected from the group consisting of a plane mirror, a concave mirror and a convex mirror.

As used in this specification and in the appended claims, the singular forms include the plural forms. For example the terms "a", "an," and "the" include plural references unless the content clearly dictates otherwise. Additionally, the term "at least" preceding a series of elements is to be understood as referring to every element in the series. The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the th mechanically mounted on the rear (nonve been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein. In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those of in the art upon reviewing the above description. The scope of the invention should therefore, be determined not with reference to the above description, but should instead be determined with reference to the appended claims, along with the full scope of equivalents to which such claims are entitled. Those skilled in the art will recognize, or will be able to ascertain using no more than routine experimentation, many equivalents to the specific embodiments of the invention described. Such equivalents are intended to be encompassed by the following claims.

What is claimed is:
1. A heliostat comprising:
 (a) a steerable mirror;
 (b) a mechanical mirror-steering mechanism;
 (c) a steering control-system; and
 (d) a steering-control sensor wherein (a)-(d) are all contained within a mechanical enclosure wherein the mechanical enclosure has a joint or a break-line about which the mechanical enclosure is separable into two or more parts, and further wherein the mechanical enclosure comprises a transparent portion, the transparent portion comprising a transparent material and is optically smooth to at least between 10 micrometer and 1 micrometer.

2. The heliostat of claim 1, further characterized in that at least one portion of the mechanical enclosure is in a shape of a portion of a spherical-shell.

3. The heliostat of claim 2, wherein the at least one spherical-shell shaped portion of the mechanical enclosure is made of a transparent material.

4. The heliostat of claim 3, wherein the at least one spherical-shell shaped portion of the enclosure subtends a solid angle at a center of more than 2 pi steradians.

5. The heliostat of claim 1, wherein the steerable mirror is either circular in shape or circular in one or more segments removed from the edge.

6. The heliostat of claim 3, wherein the at least one spherical portion of the enclosure is greater in solid angular extent as viewed from a center of the sphere than is a hemisphere.

7. The heliostat of claim 3, wherein the spherical portion of the enclosure is greater in solid angular extent as viewed from a center of the spherical-shell than is five fourths of a hemisphere.

8. The heliostat of claim 1, wherein the heliostat is self-powered.

9. The heliostat of claim 8, wherein the heliostat is self-powered by one or more first photovoltaic cells.

10. The heliostat of claim 9, wherein the one or more first photovoltaic cells are located within the mechanical enclosure.

11. The heliostat of claim 9, wherein each of the one or more first photovoltaic cells are mounted such that an optically sensitive surface of the one or morefirst photovoltaic cells faces in a direction, wherein said direction is equivalent to a direct of the reflective surface.

12. The heliostat of claim 1, wherein the steering-control sensor is fixed to an inner surface of the mechanical enclosure and is positioned to minimize an obstruction to a passage of light from a sun to a target of the heliostat's.

13. The heliostat of claim 1, wherein the steering-control sensor communicates wirelessly with the steering control-system.

14. The heliostat of claim 1, wherein the mechanical mirror-steering mechanism and the steering control-system are both mechanically mounted on a rear (non-reflective side) of the steerable mirror.

15. The heliostat of claim 1, wherein the steering control mechanism is remotely controllable from outside the mechanical enclosure via a wireless link.

16. The heliostat of claim 1, wherein the steerable mirror is selected from a group consisting of a plane mirror, a concave mirror and a convex mirror.

* * * * *

UNITED STATES PATENT AND TRADEMARK OFFICE
CERTIFICATE OF CORRECTION

| | |
|---|---|
| PATENT NO. | : 9,766,439 B2 |
| APPLICATION NO. | : 14/874374 |
| DATED | : September 19, 2017 |
| INVENTOR(S) | : Tommei |

It is certified that error appears in the above-identified patent and that said Letters Patent is hereby corrected as shown below:

In the Specification

Column 2, Line 34: insert the word --however-- after "conditions,";

Column 2, Line 45: delete the word "one";

Column 3, Line 8: insert a --,-- after the word "form";

Column 3, Line 10: insert the word --and-- before the word "wrinkles";

Column 4, Line 24: the word "aspects" should read "aspect";

Column 5, Line 40: remove the "-" in the phrase "wind-loading";

Column 5, Line 54: the word "micro.meter" should read "micrometer";

Column 5, Line 55: the word "micro.meter" should read "micrometer";

Column 5, Line 56: the word "micro.meter" should read "micrometer";

Column 5, Line 65: the word "FIG" should read "FIGS";

Column 6, Line 4: the word "depicts" should read "depict";

Column 6, Line 9: the word "shows" should read "show";

Column 6, Line 24: remove the "-" in the phrase "wind-loading";

Column 6, Line 37: the word "fill" should read "full";

Signed and Sealed this
Seventh Day of November, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,766,439 B2

Column 7, Line 28: the word "FIG" should read "FIGS";

Column 9, Line 51: insert the word --the-- after the word "at";

Column 11, Line 1: the word "steeling" should read "steering";

Column 11, Line 38: remove the "-" in the phrase "wind-loading";

Column 11, Line 67: replace the "th" with the word "term";

Column 11, Line 67: the word "(nonve" should read "have";

Column 12, Line 26: delete the word "of";

In the Claims

Column 13, Line 14 Claim 11: the phrase "morefirst" should read "more first";

Column 13, Line 16 Claim 11: the word "direct" should read "direction.".